United States Patent
Zheng et al.

(10) Patent No.: US 10,805,441 B2
(45) Date of Patent: Oct. 13, 2020

(54) WEB REAL-TIME VOICE COMMUNICATION METHOD IMPLEMENTED BASED ON SCANNING TWO-DIMENSIONAL CODE

(71) Applicant: FREEFLY881 COMMUNICATIONS INC., Markham (CA)

(72) Inventors: Edward Zheng, Markham (CA); Raymond Kwan, Markham (CA)

(73) Assignee: FREEFLY881 COMMUNICATIONS INC., Markham (CA)

( * ) Notice: Subject to any disclaimer, the term of this patent is extended or adjusted under 35 U.S.C. 154(b) by 154 days.

(21) Appl. No.: 16/039,563

(22) Filed: Jul. 19, 2018

(65) Prior Publication Data
US 2019/0028581 A1    Jan. 24, 2019

(30) Foreign Application Priority Data
Jul. 21, 2017 (CN) .......................... 2017 1 0602668

(51) Int. Cl.
*G06F 15/16* (2006.01)
*H04M 1/2755* (2006.01)
(Continued)

(52) U.S. Cl.
CPC ........ *H04M 1/2755* (2013.01); *G06K 7/1417* (2013.01); *G06K 19/06037* (2013.01);
(Continued)

(58) Field of Classification Search
CPC .. H04M 1/2755; H04M 7/003; G06K 7/1417; G06K 19/06037; H04L 61/1529; H04L 61/2092; H04L 61/3085; H04L 61/605; H04L 65/1006; H04L 65/1059; H04L 65/1069; H04L 65/1073; H04L 67/02; H04L 67/10; H04L 67/141; H04L 67/143; H04L 67/34
See application file for complete search history.

(56) References Cited

U.S. PATENT DOCUMENTS

| | | | |
|---|---|---|---|
| 8,532,283 B1 * | 9/2013 | Haggerty | ............ H04M 3/5183 379/114.13 |
| 2009/0161843 A1 * | 6/2009 | Sylvain | ............... H04L 65/1069 379/93.09 |

(Continued)

*Primary Examiner* — Yves Dalencourt
*Assistant Examiner* — Sahera Halim (57) ABSTRACT

The disclosure relates to a method for web real-time voice communication based on two-dimensional code scanning which, even when the called party does not have its own web, can automatically generate a temporary web embedded with a web communication plug-in for the called party by a network voice communication SIP server, and realizes web real-time voice communication based on two-dimensional code scanning. In addition, by using the web real-time voice communication technology, the calling party can communicate with the called party without downloading and installing the client, and the calling party can call and communicate with the called party answering terminal by the web real-time communication SIP server and the network voice communication SIP server, only with the need to scan a two-dimensional code to use the web communication plug-in on the web of the called party or the temporarily generated web.

10 Claims, 5 Drawing Sheets

(51) Int. Cl.
   *H04L 29/06*     (2006.01)
   *H04L 29/08*     (2006.01)
   *G06K 7/14*      (2006.01)
   *G06K 19/06*     (2006.01)
   *H04L 29/12*     (2006.01)
   *H04M 7/00*      (2006.01)

(52) U.S. Cl.
   CPC ...... *H04L 61/1529* (2013.01); *H04L 65/1006* (2013.01); *H04L 65/1059* (2013.01); *H04L 65/1069* (2013.01); *H04L 65/1073* (2013.01); *H04L 67/02* (2013.01); *H04L 67/10* (2013.01); *H04L 67/141* (2013.01); *H04L 67/143* (2013.01); *H04L 67/34* (2013.01); *H04L 61/2092* (2013.01); *H04L 61/3085* (2013.01); *H04L 61/605* (2013.01); *H04M 7/003* (2013.01)

(56) References Cited

U.S. PATENT DOCUMENTS

2009/0213844 A1* 8/2009 Hughston ........... H04M 3/4872
                                                    370/352
2013/0095807 A1* 4/2013 Bhaumik ............. H04W 4/023
                                                    455/417

* cited by examiner

WEB REAL-TIME VOICE COMMUNICATION METHOD IMPLEMENTED BASED ON SCANNING TWO-DIMENSIONAL CODE

CROSS-REFERENCE TO RELATED APPLICATIONS

The present application is based upon and claims priority of Chinese Patent Application No. 201710602668.7, filed before Chinese Patent Office on Jul. 21, 2017 and entitled "WEB REAL-TIME VOICE COMMUNICATION METHOD IMPLEMENTED BASED ON SCANNING TWO-DIMENSIONAL CODE," the entire contents of which is incorporated herein by reference.

TECHNICAL FIELD

The present disclosure relates to the field of network communication technologies, and in particular, to a method for web real-time voice communication based on two-dimensional code scanning.

BACKGROUND

With the development of Wi-Fi and mobile Internet, the coverage rate thereof is becoming larger and larger. The sharing nature of the Internet has brought great convenience to people. In the field of communication, the utilization of the sharing nature of the Internet has resulted in free calls, and due to low expenses of network voice communication services, market demands for network voice communication products have been rapidly increased. For example, in methods for implementing network voice communication by downloading and installing an app or a plug-in, the network voice communication app or plug-in is mainly responsible for establishing and controlling a call, and is often designed to have multiple modules and multiple layers to distinguish different functions, and respective tasks are designed independently for these functional modules. Message exchange in communications by a traditional network voice communication app is directly performed by two clients. Both the calling party and the called party need to download and install a client or a plug-in for communication, which causes inconvenience and tediousness during network voice communications.

In addition, as a brand-new information storage, transmission and recognition technology, two-dimensional code has received attentions from many countries in the world since its birth. The United States, Germany, Japan, and other countries have applied the two-dimensional code technology not only to public security, diplomacy, and military departments for the management of various types of certificates, but also to customs and taxation departments for the management of various types of statements and bills, to commercial and transportation departments for the management of goods and cargo transportation, to postal departments for the management of postal parcels, and to industrial production fields for the automated management of industrial production lines. China began the research of the two-dimensional code technology in 1993. With the continuous improvement of China's market economy and the rapid development of information technology, domestic demands for the new two-dimensional code technology are increasing. However, at present, there is no research of utilizing the two-dimensional code scanning technology to access a network based on scanning code so as to implement web real-time voice communication.

SUMMARY

An objective of the present disclosure is to provide a method for web real-time voice communication based on two-dimensional code scanning, so as to address the inconvenience that both parties need to download and install a client or a plug-in during existing network voice communications.

To achieve the above objective, the present disclosure provides a method web real-time voice communication based on two-dimensional code scanning, the web real-time voice communication comprising: registering a user with a network voice communication Session Initiation Protocol (SIP) server so as to obtain a network voice communication SIP number and a first two-dimensional code, the first two-dimensional code carrying a registered user information, a user SIP Uniform Resource Identifier (URI) link, and a network voice communication SIP server Uniform Resource Location (URL) link; the registered user logging in to the account to complete call plug-in settings on a user page and obtain a second two-dimensional code, the second two-dimensional code carrying a URL link that the user has determined and has the HyperText Markup Language (HTML) code of the call plug-in affixed thereto; turning on the two-dimensional code scanner of the communication terminal of the calling party to scan the two-dimensional code of the called party, the two-dimensional code of the called party being the first two-dimensional code or the second two-dimensional code; recognizing the URL link of the two-dimensional code of the called party by the two-dimensional code scanner, and transmitting same to the browser on the communication terminal of the calling party, and opening the URL link; according to the information concerning the two-dimensional code, recognizing the two-dimensional code of the called party to be the first two-dimensional code or the second two-dimensional code; if the scanned two-dimensional code of the called party is the second two-dimensional code, opening a web link of the called party carrying a call plug-in base on the second two-dimensional code; if the scanned two-dimensional code of the called party is the first two-dimensional code, starting the network voice communication SIP server base on the first two-dimensional code, to generate a temporary server associated with the registered user information of the called party and the user SIP URI link; the temporary server generating a temporary web having a call plug-in, the call plug-in on the temporary web being associated with the registered user information of the called party and the user SIP URI; triggering a call button of the communication plug-in on the web of the called party or on the temporary web, to make a call request to the network voice communication SIP server; establishing a web real-time communication channel between the calling party and the called party by a web real-time communication SIP server and the network voice communication SIP server; the calling party and the called party beginning the call; wherein the communication terminal of the calling party has no network voice communication SIP service terminal app installed thereon and has a browser supporting Web RTC, and the called party is the user registered with the network voice communication SIP server.

According to the method for web real-time voice communication based on two-dimension code scanning disclosed in the present disclosure, the network voice communication SIP server causes the user information, and the user selected network voice communication SIP number, first two-dimensional code and second two-dimensional code associated with each other, and stores same in a database.

According to the method for web real-time voice communication based on two-dimension code scanning disclosed in the present disclosure, after the user has been registered and has obtained the network voice communication SIP number and the first two-dimensional code, the network voice communication SIP server controls a jump to a call start page, the call start page being provided with a start to dial button.

According to the method for web real-time voice communication based on two-dimension code scanning disclosed in the present disclosure, the call start page is further provided with a call plug-in generation guide button, by use of which a jump to a call plug-in setting guide page is carried out, where the user is guided step by step to set the call plug-in on their own web and is prompted to prepare the URL link of the address of their own web for the setting of the call plug-in.

According to the method for web real-time voice communication based on two-dimension code scanning disclosed in the present disclosure, the process of setting the call plug-in comprises: successfully logging in to the account on the web of the network voice communication SIP server to set the call plug-in; generating the HTML code of the call plug-in for the user; the user inputting the URL link that has been determined; associating the determined URL link with the HTML code of the call plug-in and storing same into the database; generating, for the user, a second two-dimensional code carrying the determined URL link and displaying same on the screen; and the user embedding the generated HTML code of the call plug-in into the web of the determined URL link.

According to the method for web real-time voice communication based on two-dimension code scanning disclosed in the present disclosure, before the HTML code of the call plug-in has been generated, the user is prompted whether to set the call plug-in immediately, and if the user refuses to set the call plug-in immediately, the user is prompted to return when agreeing to set the call plug-in immediately, to complete the setting and obtain the second two-dimensional code.

According to the method for web real-time voice communication based on two-dimension code scanning disclosed in the present disclosure, when the user has not yet determined whether to use the URL link of the web of the call plug-in, the user is prompted to return when determining to use the URL link of the web of the call plug-in, to complete the setting and obtain the second two-dimensional code.

According to the method for web real-time voice communication based on two-dimension code scanning disclosed in the present disclosure, the web real-time voice communication further comprises: determining, by the call plug-in on the web of the called party or the temporary web, whether the communication terminal of the calling party has a network voice communication SIP service app installed thereon and whether the browser of the communication terminal of the calling party supports Web Real-Time Communication (RTC).

According to the method web real-time voice communication based on two-dimension code scanning disclosed in the present disclosure, if the communication terminal of the calling party has a network voice communication SIP service app installed thereon, the number of the called party is dialed automatically by the network voice communication SIP service app of the communication terminal of the calling party.

According to the method web real-time voice communication based on two-dimension code scanning disclosed in the present disclosure, if the browser of the communication terminal of the calling party does not support Web RTC, the call button of the communication plug-in on the web of the called party or the temporary web appears dark and the user is prompted that the normal use of the call plug-in can be enabled only by the use of a browser that supports Web RTC.

The present disclosure has the following advantages:

The present disclosure utilizes the unique two-dimensional code scanning technology, and even when the called party does not have its own web, the present disclosure can automatically generate a temporary web embedded with a web communication plug-in for the called party by the network voice communication SIP server, and realizes web real-time voice communication based on two-dimensional code scanning. In addition, according to the present disclosure, by using the web real-time voice communication technology, the calling party can communicate with the called party without downloading and installing the client, wherein the calling party can call and communicate with the called party answering terminal by the web real-time communication SIP server and the network voice communication SIP server, only with the need to scan a two-dimensional code to use the web communication plug-in on the web of the called party or the temporarily generated web.

DETAILED DESCRIPTION OF THE EMBODIMENTS

The following embodiments are intended to illustrate the present disclosure rather than limit the scope of the present disclosure.

Embodiment 1

The method for web real-time voice communication based on two-dimensional code scanning disclosed in this embodiment comprises the following three phases: a user registration phase, a call plug-in setting phase, and a two-dimensional code scanning and call requesting phase.

Figure 1:
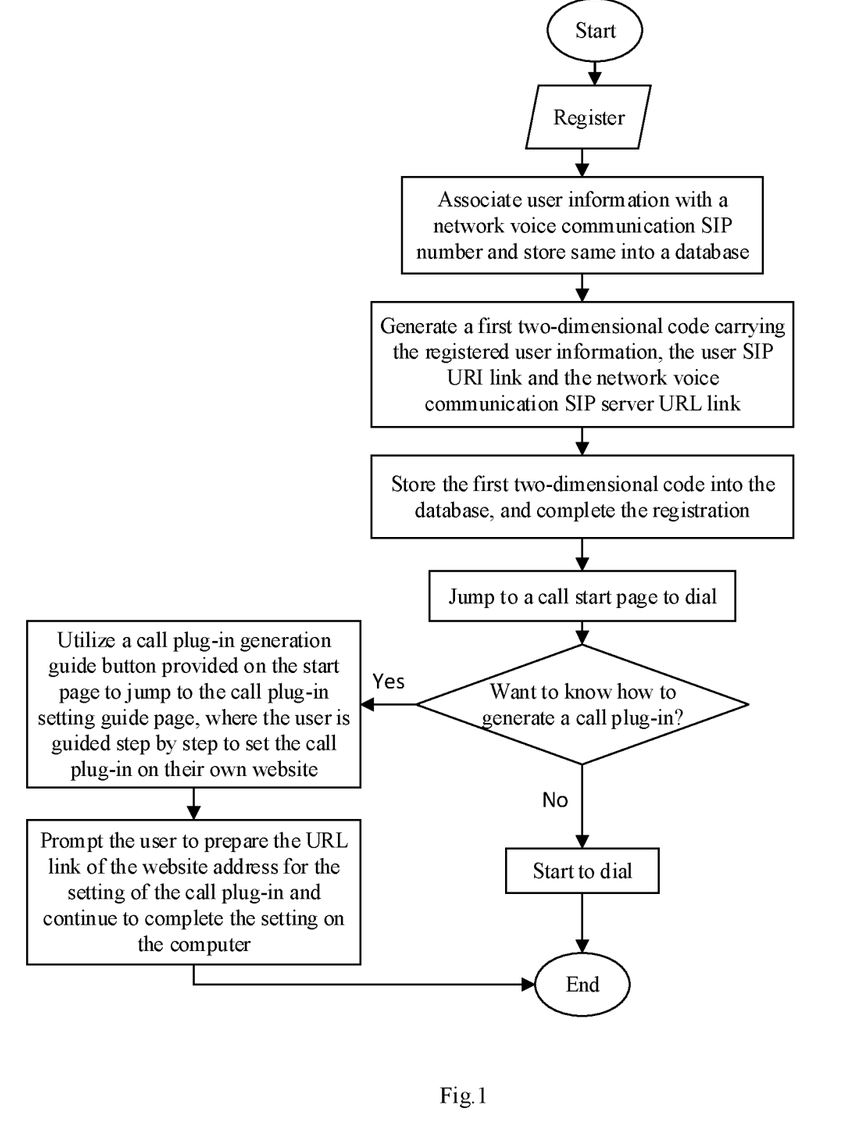
FIG. 1 is a flow chart of a user registration phase of a method for web real-time voice communication based on two-dimensional code scanning disclosed in the present disclosure.

Referring to FIG. 1, the above-mentioned user registration phase comprises: registering a user with a network voice communication SIP server and obtaining a network voice communication SIP number; the network voice communication SIP server associating the user information with the user selected network voice communication SIP number and storing same in a database; the network voice communication SIP server generating, for the user, a first two-dimensional code carrying the registered user information, a user SIP URI link and a network voice communication SIP server URL link; the network voice communication SIP server storing the first two-dimensional code in the database and completing the registration. In this way, by being registered with the network voice communication SIP server, the user obtains not only the network voice communication SIP number but also the first two-dimensional code. In addition, after the registration has been completed, a jump to the call start page is carried out, and the call start page is provided with a start to dial button and a call plug-in generation guide button, by use of which call plug-in generation guide button a jump to a call plug-in setting guide page may be carried out, where the user is guided step by step to set the call plug-in on their own website and is prompted to prepare the URL link of the address of their own website for the setting of the call plug-in, and the user may make a call by means of the start to dial button.

Figure 2:
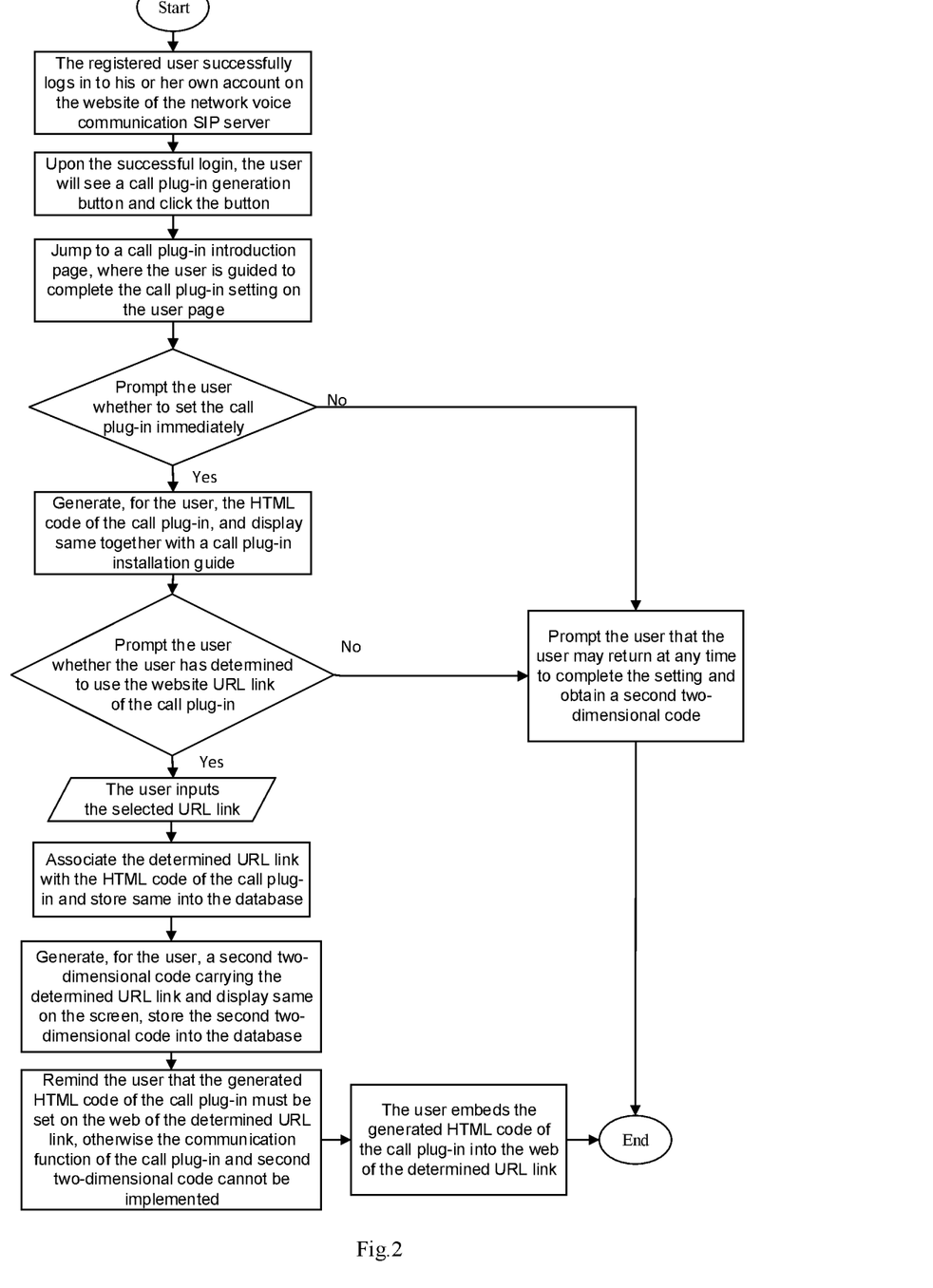
FIG. 2 is a flow chart of a call plug-in setting phase of a method for network voice communication based on a web communication plug-in disclosed in the present disclosure.

Referring to FIG. 2, the above-mentioned call plug-in setting phase comprises: the registered user successfully logging in to his or her own account on the network voice communication SIP server website; upon the successful login, the user seeing a call plug-in generation button, clicking this button, jumping to a call plug-in introduction page, where the user is guided about how to complete the call plug-in setting on the user page; prompting the user whether to set the call plug-in immediately; if the user refuses to set the call plug-in immediately, prompting the user that the user may return at any time (that is, when the user agrees to set the call plug-in immediately) to complete the setting and obtain a second two-dimensional code; if the user agrees to set the call plug-in immediately, generating the HTML code of the call plug-in for the user, and displaying same together with a call plug-in installation guide; prompting the user whether the user has determined to use the website URL Link of the call plug-in; if the user has not yet determined to use the website URL link of the call plug-in, prompting the user that the user may return at any time (that is, when the user has determined to use the website URL link of the call plug-in) to complete the setting and obtain the second two-dimensional code; if the user has determined to use the website URL of the call plug-in, the user inputting the selected URL link; associating the determined URL link with the HTML code of the call plug-in and storing same in the database; generating, for the user, the second two-dimensional code carrying the determined URL link, and displaying same on the screen; storing the second two-dimensional code information in the database; prompting the user that the generated HTML code of the call plug-in must be set on the website of the determined URL link, otherwise the communication function of the call plug-in and the second two-dimensional code cannot be implemented; the user embedding the generated HTML code of the call plug-in into the web of the determined URL link.

In the above-mentioned user registration phase and call plug-in setting phase, when storing the user information and the user-selected network voice communication SIP number, first two-dimensional code, and second two-dimensional code, the network voice communication SIP server needs to associate the user information with the user selected network voice communication SIP number, first two-dimensional code and second two-dimensional code.

Figure 3A:
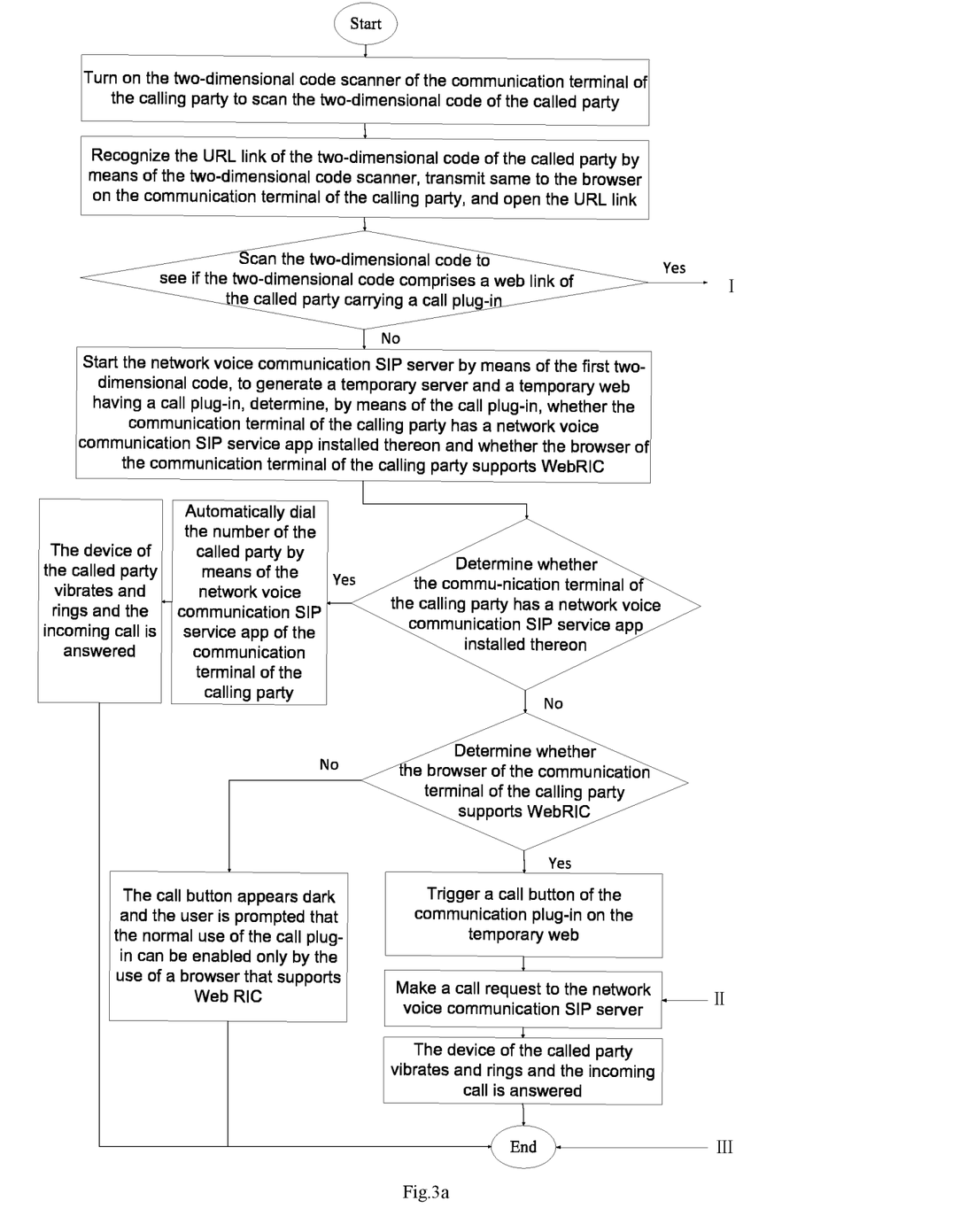
FIG. 3(a) and FIG. 3(b) are flow charts of a two-dimensional code scanning and call requesting phase of the method for web real-time voice communication based on two-dimensional code scanning disclosed in the present disclosure.
Figure 3B:
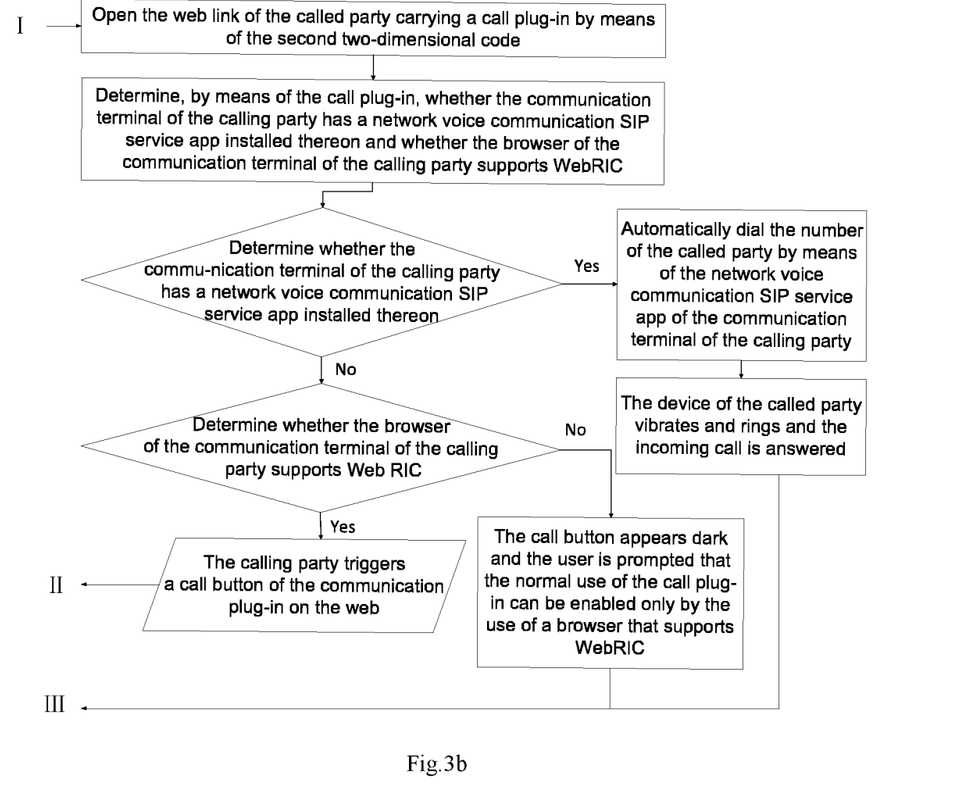

Referring to FIGS. 3(a) and 3(b), the above-mentioned two-dimensional code scanning and call requesting phase comprises: turning on the two-dimensional code scanner of the communication terminal of the calling party to scan the two-dimensional code of the called party; recognizing, by the two-dimensional code scanner, the URL link of the two-dimensional code of the called party, transmitting same to the browser on the communication terminal of the calling party, and opening the URL link; recognizing, according to the two-dimensional code information, the scanned two-dimensional code of the called party as the first two-dimensional code or the second two-dimensional code, wherein the recognition process also recognizes whether the scanned two-dimensional code comprises the web of the called party carrying the call plug-in, if the scanned two-dimensional code is the second two-dimensional code, the scanned two-dimensional code comprises the web of the called party carrying the call plug-in, otherwise, if the scanned two-dimensional code of the called party is the first two-dimensional code, the scanned two-dimensional code does not comprise the web of the called party carrying the calling plug-in; if the scanned two-dimensional code of the called party is the second two-dimensional code, opening, base on the second two-dimensional code, the website link of the called party carrying the call plug-in; determining, by the call plug-in on the web of the called party, whether the communication terminal of the calling party has a network voice communication SIP service app installed thereon and whether the browser of the communication terminal of the calling party supports web real-time communication (Web RTC); first determining whether the communication terminal of the calling party has a network voice communication SIP service app installed thereon; if the communication terminal of the calling party has a network voice communication SIP service app installed thereon, automatically dialling the number of the called party by the network voice communication SIP service app of the communication terminal of the calling party; if the communication terminal of the calling party does not has a network voice communication SIP service app installed thereon, determining whether the browser of the communication terminal of the calling party supports Web RTC; if the browser of the communication terminal of the calling party supports Web RTC, triggering the call button of the web communication plug-in to make a call request to the network voice communication SIP server; if the browser of the communication terminal of the calling party does not support Web RTC, the call button of the web communication plug-in appearing dark and prompting the user that the normal use of the call plug use can be enabled only by the use of a browser that supports Web RTC; if the scanned two-dimensional code of the called party is the first two-dimensional code, starting, base on the first two-dimensional code, the network voice communication SIP server to generate a temporary server associated with the registered user information of the called party and the user SIP URI link; the temporary server generating a temporary web carrying a call plug-in associated with the registered user information of the called party and the user SIP URI; determining, by the call plug-in on the temporary web of the called party, whether the communication terminal of the calling party has a network voice communication SIP service app installed thereon and whether the browser of the communication terminal of the calling party supports Web RTC; first determining whether the communication terminal of the calling party has a network voice communication SIP service app installed thereon; if the communication terminal of the calling party has a network voice communication SIP service app installed thereon, automatically dialling the number of the called party by the network voice communication SIP service app of the communication terminal of the calling party; if the communication terminal of the calling party does not have a network voice communication SIP service app installed thereon, determining whether the browser of the communication terminal of the calling party supports Web RTC; if the browser of the communication terminal of the calling party supports Web RTC, triggering the call button of the temporary web communication plug-in to make a call request to the network voice communication SIP server; if the browser of the communication terminal of the calling party does not support Web RTC, the call button of the temporary web communication plug-in appearing dark and prompting the user that the normal use of the call plug-in can be enabled only by the use of a browser supporting Web RTC.

Figure 4:
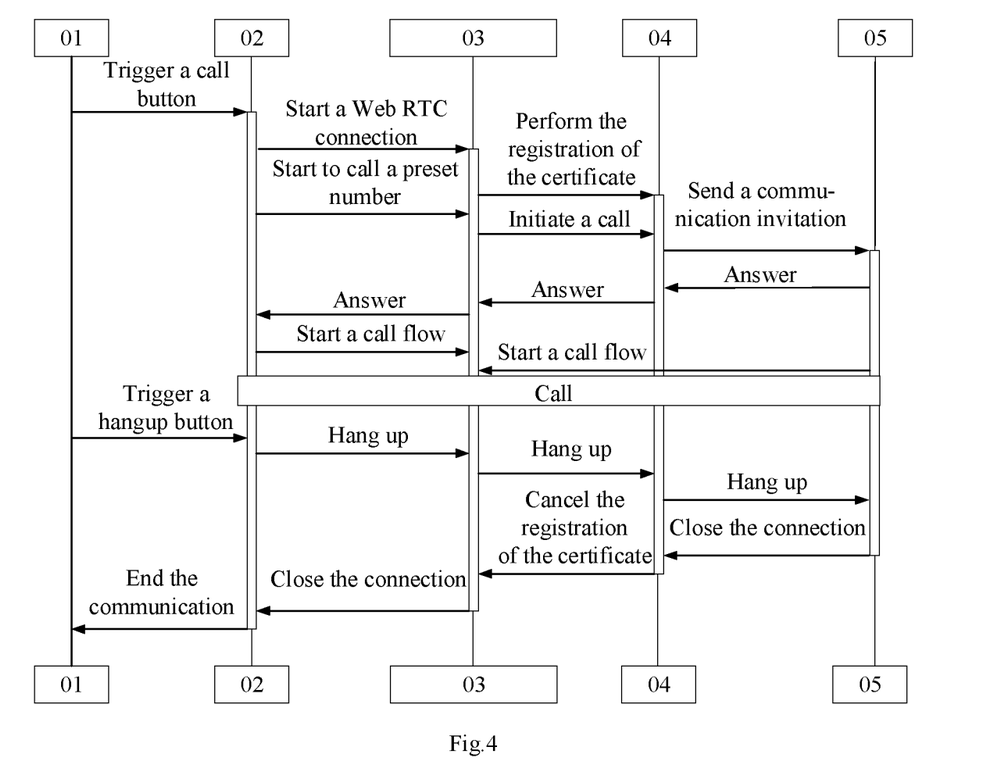
FIG. 4 is a flow chart of a method for network voice communication based on a web communication plug-in, of the method for web real-time voice communication based on two-dimensional code scanning disclosed in the present disclosure.

As described above, after scanning a unique technical link using a two-dimensional code to open the web of the called party or temporarily generate a temporary web, the network voice communication system implemented based on the web communication plug-in can implement network voice communication. Further, it implements a call between the calling party and the called party by establishing a web real-time communication channel between the calling party and the called party by the web real-time communication SIP server and the network voice communication SIP server. Referring to FIG. 4, the above-mentioned network voice communication system implemented based on a web communication plug-in comprises a web communication plug-in 02, a web real-time communication SIP server 03, a network voice communication SIP server 04 and a called party answering terminal 05.

The web communication plug-in 02 is used for establishing a call flow communication channel with the called party answering terminal 05 for a call. The web communication plug-in 02 is embedded into the web or the temporary web. The web communication plug-in 02 is provided with a call button component and a hangup button component. After the requesting party and the called party have begun the call, the call button component controls the call button to disappear, the hangup button component controls the hangup button to be displayed in the web; the web real-time communication SIP server 03 is used for establishing a web real-time communication connection between the web communication plug-in 02 and the called party answering terminal 05, comprising establishing a web real-time communication connection between the web communication plug-in 02 and the web real-time communication SIP server 03 and establishing a web real-time communication connection between the web real-time communication SIP server 03 and the called party answering terminal 05, wherein establishing a web real-time communication connection between the web communication plug-in 02 and the web real-time communication SIP server 03 is performed by the requesting party 01 by establishing a web real-time communication connection by the web communication plug-in 02 and the web real-time communication SIP server 03; establishing a web real-time communication connection between the web real-time communication SIP server 03 and the called party answering terminal 05 is performed by the called party answering terminal 05 by establishing a web real-time communication connection by the network voice communication SIP server 04 and the web real-time communication SIP server 05. The network voice communication SIP server 04 is used for establishing a web real-time communication connection between the web real-time communication SIP server 03 and the called party answering terminal 05. The called party answering terminal 05 comprises a mobile phone, a computer, a tablet computer, an IP phone (web phone), and an internet phone (Internet accessible, without a telecommunication signal receiving function), and is used for establishing a call flow communication channel with the web communication plug-in 02 in order for a call with the requesting party 01; wherein after being registered with the network voice communication SIP server 04, the called party answering terminal 05 obtains a communication number; the web communication plug-in 02 is correlated, via the network, with the called party answering terminal 05, the web real-time communication SIP server 03 and the network voice communication SIP server 04; the called party answering terminal 05 is correlated, via the Internet, with the network voice communication SIP server 04; and the network voice communication SIP server 04 is also correlated, via the network, with the web real-time communication SIP server 03.

Referring to FIG. 4, the method for web voice communication based on a web communication plug-in comprises: the requesting party 01 requesting a preset number by the web communication plug-in 02; the web communication plug-in 02 connecting to the web real-time communication SIP server 03 to open the web real-time communication connection; the web real-time communication SIP server 03 registering the certificate with the network voice communication SIP server 04 and initiating a call communication request; the network voice communication SIP server 04 sending a communication invitation to the called party answering terminal 05; after the called party accepts the communication invitation, the called party answering terminal 05 passing the acceptance message back to the web communication plug-in 02 by the web network voice communication SIP server 04 and the web real-time communication SIP server 03 in sequence; after the web real-time communication SIP server 03 and the network voice communication SIP server 04 receive the acceptance message regarding the called party having accepted the communication invitation, the web real-time communication SIP server 03 establishing a communication connection with the called party via the network voice communication SIP server 04; the called party answering terminal 05 starting a call flow with the web real-time communication SIP server 03 via the network voice communication SIP server 04, and after receiving, from the web real-time communication SIP server 03, the acceptance message regarding the called party accepting the communication invitation, the web communication plug-in 02 starting a call flow with the web real-time communication SIP server 03; thus, the requesting party 01 and the called party beginning the call by means of the call flow communication channel.

The foregoing preset number is the communication number of the called party registered with the network voice communication SIP server 04. Further, the method for the network voice communication SIP server 04 to provide web voice communication comprises: users over the world applying for a network voice communication service from the network voice communication SIP server 04 by a network voice communication client; a user registering user information; the user creating a network voice communication number using his or her own mobile phone number, the network voice communication number being composed of a fixed three-digit number, country code and a mobile phone number arranged in turn, the three-digit number being 881;

or, the system pushing a plurality of network voice communication numbers; the user selecting one from the plurality of network voice communication numbers pushed as his or her own network voice communication number, the network voice communication number being composed of a fixed three-digit number and ten arbitrary digits arranged in sequence, the fixed three-digit number being 882; the user obtaining a network voice communication number, the network voice communication number being completely composed of multiple digits; generating user information, the user information comprising name, network voice communication number and e-mail address, these three kinds of information being necessary, the user information further comprising one or more of mobile phone number, country, network link, website address, occupation, and personal description, wherein the personal description could be composed of one or more keywords, and the foregoing information could be selectively filled in by the user; forming a phone book based on the generated user information, and displaying same on the user terminal, thereby a free global phone book service being able to be realized through Wi-Fi and the Internet, wherein a user queries the phone book through a key character or a keyword by a user terminal, the company and personal information of the user information can be searched for globally, and the unique global phone book search integrates registered users anywhere in the world, and can help companies and individuals to be confirmed and contacted; using the network voice communication number as the network address of the user's network voice communication; users having obtained the network voice communication number carrying out voice communication therebetween through the Internet; wherein, users who have been registered and have obtained a network voice communication number for network voice communication do not need the process of invitation or acceptance or authentication therebetween, that is, do not need the process of invitation or acceptance or authentication in order to call a contact on the contact list of the phone book, as long as users directly dial the network voice communication number after logging in to the network voice communication client, without international roaming charges at the same time.

In the above description, one purpose of registering a network voice communication number for a company user may be to allow more people to search for themselves through the global phone book. In addition to the contact of the company, contact information, website address, and profile of the company to be filled in, keyword is a very important part. During user information registration, the user fills out the first page of detailed information, submits it and comes to the second page, where the user is asked to fill in website address, link, industry, keyword and profile, all of which are selective, however the more information is filled in, the more probably the user will be discovered, especially when a keyword is set. A part of the name of the company can be extracted for keyword settings. For example, with regard to a wood company, considering the customer's needs, wood can be used as a keyword, the name of a product of the company or the industry to which the company belongs may also be selected, and the best way is to successfully set all the three kinds of keywords, as setting more keywords can increase the probability of being searched for.

Referring to FIG. 4, the method for web voice communication based on the web communication plug-in further comprises: the requesting party 01 hanging up the network voice communication by the web communication plug-in 02; the web communication plug-in 02 transmitting the hangup message to the called party answering terminal 05 via the web real-time communication SIP server 03 and the network voice communication SIP server 04 sequentially; after receiving the hangup message from the web communication plug-in, the called party answering terminal 05 closing the communication connection with the network voice communication SIP server 04 based on the hangup message; after receiving the hangup message from the web communication plug-in, the network voice communication SIP server 04 cancelling the registration of the certificate of the web real-time communication SIP server 03 based on the hangup message; after receiving the hangup message from the web communication plug-in, the web real-time communication SIP server 03 closing the communication connection with the web communication plug-in 02; thus, the communication between the requesting party and the called party being hanged up.

In addition, the above method for network voice communication based on a web communication plug-in may further comprise hanging up the network voice communication between the requesting party and the called party by the called party answering terminal, specifically comprising: the called party answering terminal 05 hanging up the network voice communication; the called party answering terminal closing the communication connection with the network voice communication SIP server; the network voice communication SIP server 04 cancelling the registration of the certificate of the web real-time communication SIP server based on the hangup message of the called party answering terminal; the web real-time communication SIP server closing the communication connection with the web communication plug-in based on the hangup message of the called party answering terminal; thus, the communication between the requesting party and the called party being hanged up. At the time, the called party answering terminal 05 does not need to send the hangup message to the web communication plug-in 02 through the network voice communication SIP server 04 and the web real-time communication SIP server 03 in sequence, the web communication plug-in 02, the web real-time communication SIP server 03 and the network voice communication SIP server 04 can also obtain the hangup message regarding the called party answering terminal 05 hanging up the network voice communication, that is, when the called party answering terminal closes the communication connection with the network voice communication SIP server 04, the network voice communication SIP server 04 automatically obtains the hangup message; when the network voice communication SIP server 04 cancels the registration of the certificate of the web real-time communication SIP server, the web real-time communication SIP server 03 automatically obtains the hang up message; when the web real-time communication SIP server 03 closes the communication connection with the web communication plug-in 02, the web communication plug-in 02 automatically obtains the hangup message.

Although the present disclosure has been described above in detail with general description and specific embodiments, it is obvious to those skilled in the art that some modifications or improvements can be made on the basis of the present disclosure. Therefore, these modifications or improvements made without departing from the spirit of the present disclosure all fall within the protection scope of the present disclosure.

What is claimed is:

1. A method for web real-time voice communication based on two-dimensional code scanning, comprising:

registering a user with a network voice communication Session Initiation Protocol (SIP) server with a network voice communication SIP number and a first two-dimensional code, the first two-dimensional code carrying registered user information, a user SIP Uniform Resource Identifier (URI) link, and a Uniform Resource Locator (URL) link of a network voice communication SIP server;

providing a second two-dimensional code to the registered user, the second two-dimensional code carrying a URL link of a call plug-in, wherein the URL link of the call plug-in is associated with a HyperText Markup Language (HTML) code of the call plug-in;

turning on a two-dimensional code scanner of a communication terminal of a calling party to scan a two-dimensional code of a called party, the two-dimensional code of the called party being the first two-dimensional code or the second two-dimensional code;

recognizing a URL link of the two-dimensional code of the called party by the two-dimensional code scanner, and transmitting the URL link of the two-dimensional code to a browser on the communication terminal of the calling party, and opening the URL link;

recognizing, according to information of the two-dimensional code, the two-dimensional code of the called party to be the first two-dimensional code or the second two-dimensional code;

if the scanned two-dimensional code of the called party is the second two-dimensional code, opening a web link of the called party carrying the call plug-in base on the second two-dimensional code; or if the scanned two-dimensional code of the called party is the first two-dimensional code, starting the network voice communication SIP server base on the first two-dimensional code to generate a temporary server associated with the registered user information of the called party and the user SIP URI link; the temporary server generating a temporary web having a call plug-in, the call plug-in on the temporary web being associated with the registered user information of the called party and the user SIP URI;

triggering a call button on the web link of the called party or on the temporary web to make a call request to the network voice communication SIP server;

establishing a web real-time communication channel between the calling party and the called party by a web real-time communication SIP server and the network voice communication SIP server; and the calling party and the called party beginning the call;

wherein, the communication terminal of the calling party does not have a network voice communication SIP service terminal app installed thereon and has a browser that supports Web Real-Time Communication (RTC), and the called party is the user registered with the network voice communication SIP server.

2. The method for web real-time voice communication based on two-dimension code scanning according to claim 1, wherein the network voice communication SIP server associates the user information with the user selected network voice communication SIP number, first two-dimensional code and second two-dimensional code, and stores the user information with the user selected network voice communication SIP number, the first two-dimensional code, and the second two-dimensional code in a database.

3. The method for web real-time voice communication based on two-dimension code scanning according to claim 1, wherein after the user has been registered and has obtained the network voice communication SIP number and the first two-dimensional code, the network voice communication SIP server controls a jump to a call start page, the call start page being provided with a start to dial button.

4. The method for web real-time voice communication based on two-dimension code scanning according to claim 3, wherein the call start page is further provided with a call plug-in generation guide button, by use of which a jump to a call plug-in setting guide page is carried out, where the user is guided step by step to set the call plug-in on their own web and is prompted to prepare the URL link of the address of their own web for the setting of the call plug-in.

5. The method for web real-time voice communication based on two-dimension code scanning according to claim 1, wherein the process of setting the call plug-in comprises:
  successfully logging in to the account on the web of the network voice communication SIP server to set the call plug-in;
  generating the HTML code of the call plug-in for the user;
  the user inputting the URL link that has been determined;
  associating the determined URL link with the HTML code of the call plug-in and storing the determined URL link and the HTML code into the database;
  generating, for the user, a second two-dimensional code carrying the determined URL link, and displaying the second two-dimensional code on the screen; and
  the user embedding the generated HTML code of the call plug-in into the web of the determined URL link.

6. The method for web real-time voice communication based on two-dimension code scanning according to claim 5, wherein before the HTML code of the call plug-in has been generated, the user is prompted whether to set the call plug-in immediately, and if the user refuses to set the call plug-in immediately, the user is prompted to return when agreeing to set the call plug-in immediately, to complete the setting and obtain the second two-dimensional code.

7. The method for web real-time voice communication based on two-dimension code scanning according to claim 5, wherein when the user has not yet determined whether to use the URL link of the web of the call plug-in, the user is prompted to return when determining to use the URL link of the web of the call plug-in, to complete the setting and obtain the second two-dimensional code.

8. The method for web real-time voice communication based on two-dimension code scanning according to claim 1, wherein the method further comprising: determining, by the call plug-in on the web of the called party or the temporary web, whether the communication terminal of the calling party has a network voice communication SIP service app installed thereon and whether the browser of the communication terminal of the calling party supports Web RTC.

9. The method for web real-time voice communication based on two-dimension code scanning according to claim 8, wherein if the communication terminal of the calling party has a network voice communication SIP service app installed thereon, the number of the called party is dialed automatically by the network voice communication SIP service app of the communication terminal of the calling party.

10. The method for web real-time voice communication based on two-dimension code scanning according to claim 8, wherein if the browser of the communication terminal of the calling party does not support Web RTC, the call button of the communication plug-in on the web of the called party or the temporary web appears dark and the user is prompted that the normal use of the call plug-in can be enabled only by the use of a browser that supports Web RTC.

* * * * *